United States Patent

Alexandrov et al.

[15] 3,689,010

[45] Sept. 5, 1972

[54] LOADING AND UNLOADING STATION OF PLANT FOR THE PNEUMATIC TRANSPORTATION OF GOODS IN CONTAINERS ALONG A TUBE

[72] Inventors: Adolf Moritsovich Alexandrov, Moscow; Ippolit Davidovich Suladze, Tbilisi; Vladimir Efimovich Aglitsky, Moscow; Avtandil Semenovich Kakhniashvili, Tbilisi; Jury Abramovich Tsimbler, Moscow; Ilia Solomonovich Kantor, Moscow; Alexandr Alexandrovich Lachinov, Moscow; Vazna Venediktovich Dzhanelidze, Tbilisi; Jury Arnoldovich Topolyansky, Moscow; Alexandr Dmitrievich Kolbechenkov, Moscow; Vladimir Maiorovich Chizhikov, Moscow, all of U.S.S.R.

[73] Assignee: Spetsialnoe Konstruktorskoe Bjuro Transneftairtomatika Moscow, U.S.S.R.

[22] Filed: Feb. 17, 1971

[21] Appl. No.: 116,039

[30]     Foreign Application Priority Data

Feb. 17, 1970    U.S.S.R. ............... 1401629

[52] U.S. Cl. ............ 243/38, 243/33, 104/38, 214/41, 138/114
[51] Int. Cl. .............................................. B65g 51/04
[58] Field of Search ....243/1, 33, 38, 39, 19; 302/64; 104/38; 138/114; 214/41, 18 RK

[56]         References Cited

UNITED STATES PATENTS

| 1,556,495 | 10/1925 | Danks | 138/114 X |
| 627,181 | 6/1899 | Fordyce | 243/33 |
| 2,554,560 | 5/1951 | Craig | 34/92 X |

FOREIGN PATENTS OR APPLICATIONS

| 550,350 | 10/1956 | Belgium | 243/33 |
| 1,187,550 | 2/1965 | Germany | 243/1 |

Primary Examiner—Evon C. Blunk
Assistant Examiner—Merle F. Maffei
Attorney—Holman & Stern

[57]         ABSTRACT

A loading and unloading station of a plant for the pneumatic transportation of goods in containers along a tube in which a chamber, provided with a charging port, is cylindrical and is installed, which the section of the tube passing therethrough is and provided with a charging port and is rotatable relative to its geometrical axis, with a lid closing the chamber charging port being arranged on the inner side of the chamber and secured so as to be capable of radial movement on the rotatable section of the tube.

2 Claims, 6 Drawing Figures

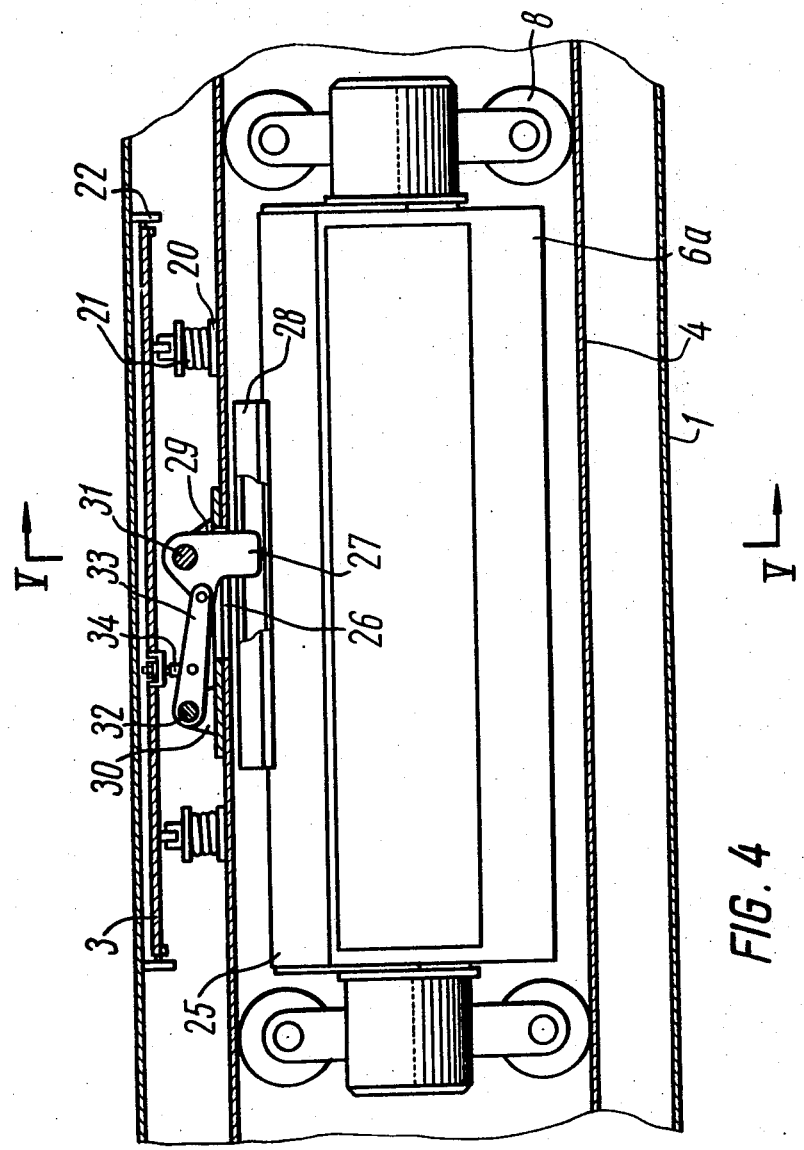

LOADING AND UNLOADING STATION OF PLANT FOR THE PNEUMATIC TRANSPORTATION OF GOODS IN CONTAINERS ALONG A TUBE

BACKGROUND OF THE INVENTION

The present invention relates to plants for the pneumatic transportation of goods in containers along tubes, and more particularly to the loading and unloading stations of the plants.

The most expedient use of a loading and unloading station according to the present invention is for loading bulk goods into containers or unloading such goods therefrom.

Known in the art are loading and unloading stations for the pneumatic transportation of mail in containers, with the capacity of the latter being filled by capsules. These stations have a chamber and a section of the tube used for transportation of the capsules with mail passing therethrough. The chamber has a port hermetically closed by a lid from the outer side of the chamber. The inner surface of the chamber has a cylindrical portion by means of which it encircles the section of tube passing therethrough.

In addition, the chamber has a pocket for the accommodation therein of a capsule before it is dispatched through the tube (or after it is unloaded from the tube). The section of the tube passing through the chamber has a port for charging (discharging) the capsule into the tube.

In the described loading and unloading station, the port of the tube section is closed by the cylindrical portion of the chamber for sealing purposes when capsules are being conveyed therealong. For this purpose, the chamber is so turned around the tube that its cylindrical portion closes the port.

When charging (discharging) a capsule into the tube, the chamber is so turned around the tube that its pocket will be opposite the port of the tube (see, for example, U.S. Pat. No. 2,710,728, cl. 243–18).

The loading and unloading station described above is used only in plants for the pneumatic transportation of mail in small capsules and cannot be used in plants for the pneumatic transportation of goods in containers having large dimensions and, consequently, a great weight. It is not expedient to extract such containers from the tube for loading (unloading) the goods therein. In addition, it is difficult to achieve an airtight closing of the charging port of the section of a large-diameter tube by the cylindrical portion of the chamber.

An object of the present invention is to eliminate the above disadvantages.

SUMMARY OF THE INVENTION

The principal object of the present invention is to provide a loading and unloading station of a plant for the pneumatic transportation of goods in containers along a tube in which the chamber and the section of the tube passing therethrough is so installed as to enable the goods to be loaded (unloaded) into containers without extracting the containers from the tube, and to ensure an airtight closing of the loading port of the tube after loading (unloading) of the goods into the containers.

This object is achieved by providing a loading and unloading station of a plant for the pneumatic transportation of goods in containers along a tube, in which a chamber having at least one charging port hermetically closed by a lid, and the section of the tube disposed therein, also having at least one charging port, are designed to be rotatable relative to each other for making the charging ports register, and wherein, according to the invention, the chamber is cylindrical and fixedly installed, while the tube section passing therethrough is rotatable relative to its geometrical axis, and by arranging the lid closing the charging port of the chamber on its inner side and securing it to be capable of radial movement on the rotatable section of the tube.

It is expedient to install on the lid, roller supports which, when the lid is closed, are disposed in recesses provided near the port on the inner surface of the chamber, and are movable when the lid is opened, along the inner surface of the chamber.

The installation of the roller supports on the lid makes it possible to reduce the resistance to its movement along the inner surface of the chamber, while, when the lid is closed, ensures it being fixed in position relative to the port of the chamber.

The loading and unloading station according to the present invention is simple to manufacture, reliable in operation, and makes it possible, with the aid of simple means, to completely mechanize and automatize the processes of loading (unloading) goods into containers without extracting the latter from the tube along which they are conveyed.

The nature of the present invention will become more fully apparent from a consideration of the following description of an exemplary embodiment thereof, taken in conjunction with the accompanying drawings, in which:

BRIEF DESCRIPTION OF THE DRAWings

FIG. 4 is a view of the loading station according to to invention and a container provided with a lid;

DETAILED DESCRIPTION OF THE INVENTION

Figure 1:
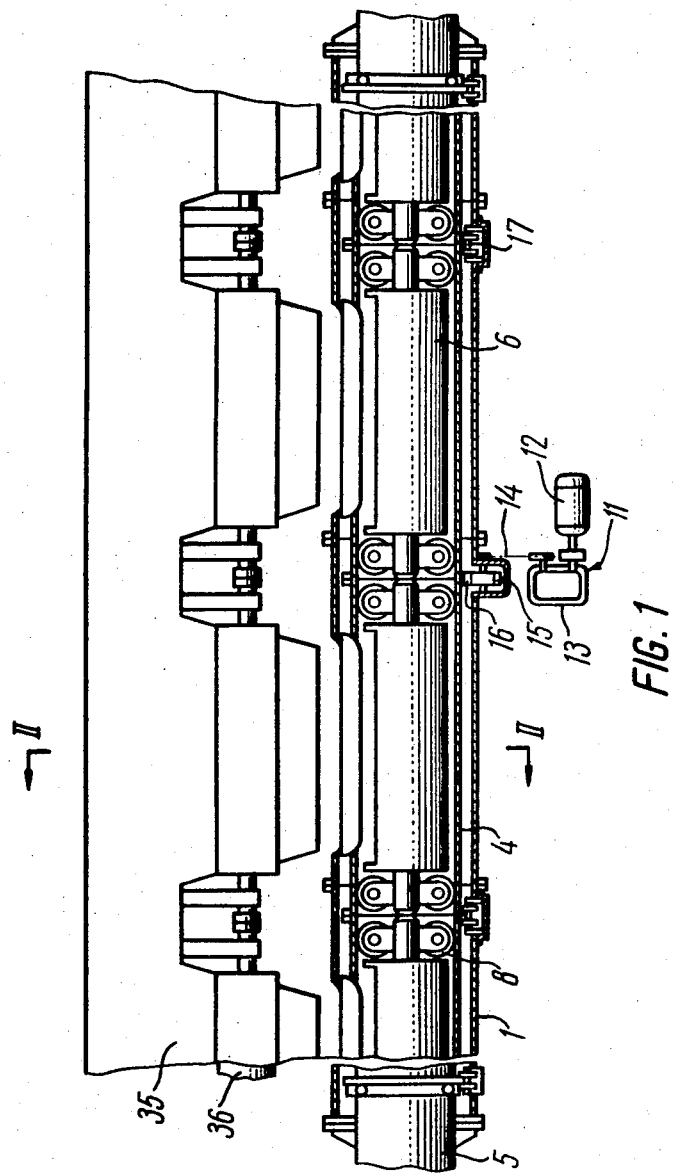
FIG. 1 is an elevational view, partly broken away and partly in section of the loading station according to the invention in connection with a batching device.

The loading station for bulk goods comprises cylindrical chamber 1 (FIGS. 1–3) which is fixedly installed. The chamber 1 is provided on the top with charging ports 2 and each of these ports is closed with lid 3 or cover 3. A tube section 4 passes through the chamber 1 with the section serving as a continuation of a tube 5 along which containers 6 are conveyed. The section 4 is provided with charging ports 7.

To prevent wheels 8 of the containers 6 from entering the openings of the ports 7, the ports are covered with screens 9, with the dimensions of the meshes being selected dependent on the size of the particles of goods being conveyed. Funnels 10 are provided for the ports 7 to prevent spilling of the goods and ensure proper direction thereof when loading the goods into the containers 6.

When the containers 6 are being conveyed along the tube 5, charging ports 2 and 7 are displaced through 90° relative to each other. To make the ports 2 and 7 register when loading goods into the containers 6, the section 4 is rotatable relative to its geometrical axis. Rotation is achieved by means of drive 11 comprising an electric motor 12, a reduction gear 13 and a chain transmission 14. The transmission 14 is connected to a gear wheel 15 meshing with a toothed sector 16 rigidly fixed on the rotatable section 4. The section 4 is installed in the chamber 1 on roller supports 17.

The ports 2 of the chamber 1 are closed by the lids 3 disposed on the inner surface of the chamber 1. Lids 3 are fixed on the rotatable section 4. Each lid for fastening purposes is provided with two shackles 18 pin-connected thereto. Each shackle 18 is pin-connected to a shackle 19 provided with a stop terminating in a sleeve that is fitted onto a rod (not shown) whose bearing surface 20 is rigidly fixed on the section 4. A spring 21 ensuring a radial movement of the lid 3 is disposed on the sleeve between the stop of the shackle 19 and the bearing surface 20.

Roller supports 22 are provided on the lid 3 to reduce the resistance when the lid 3 is being moved along the inner surface of the chamber 1.

On the inner surface of the chamber 1 near the ports 2 there are provided recesses or wells 23 into which the roller supports 22 drop, thereby fixing the position of the lid 3 relative to the port 2 when the port is closed. The roller supports 22, when disposed in the recesses 23, do not touch the surfaces of these recesses. Along the perimeter of the lid 3 there is provided a sealing gasket 24 that ensures a tight fitting of lid 3 to the inner surface of the chamber 1 as a result of the action thereon of the springs 21 and the pressure of the compressed gas used to move the containers 6 along the tube 5.

Figure 6:
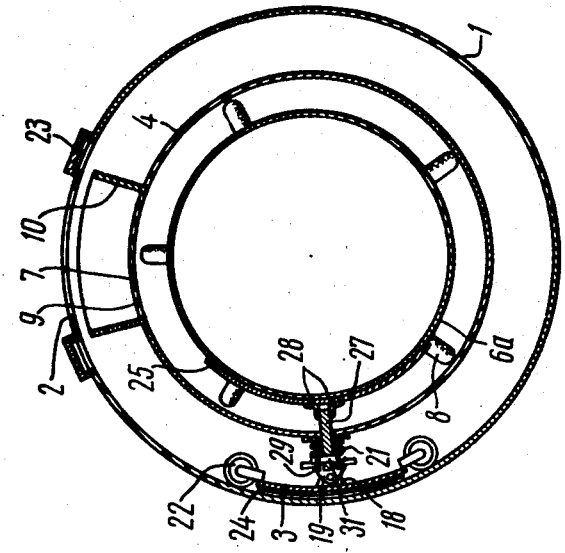
FIG. 6 is a view similar to FIG. 5 with the lids open.
Figure 5:
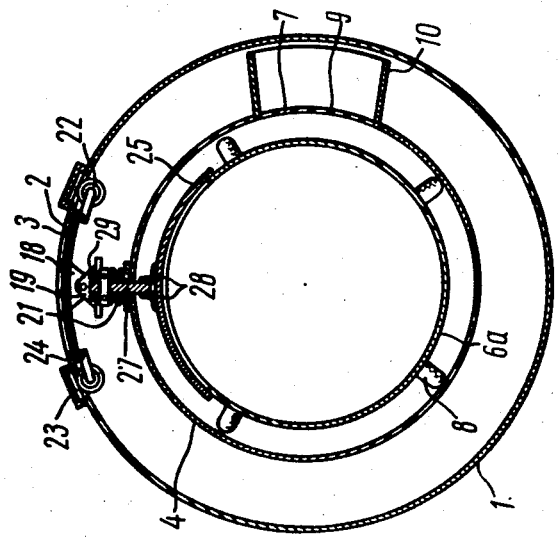
FIG. 5 is a section through V—V of FIG. 4, with the lids of the container and the chamber charging port closed.

Should container 6a (FIGS. 4-6) be used, and which is closed by a planetary lid 25, a slot 26 is provided on the section 4 of the tube 5 to ensure simultaneous opening (closing) of the lid 25 with the lid 3 of the chamber 1. A fixing device 27 enters a slot 26 and coacts with the lid 25 of the container 6a, and is provided for this purpose with a groove defined by two angles 28 disposed along the generatrix of the lid 25.

Brackets 29 and 30 are rigidly fixed at both sides of slot 26 on the outer surface of the rotatable tube section 4. The bracket 29 carries the fixing device 27 pin-connected on an axle 31. The bracket 30 carries a lever 33 with the aid of an axle 32. An end of an arm of the lever 33, is pin-connected to the fixing device 27. The lid 3 of the chamber 1 is pin-connected to the lever 33 through a tie rod 34.

It is possible to use a separate drive for the interaction of the fixing device 27 with the lid 25 of the container 6a. This drive will be operatively connected to the drive 11 for turning the tube section 4 to ensure a synchronization of the opening (closing) of the lids 3 and 25.

The unloading station in the main has a design similar to that of the loading station above described. The discharging ports of the unloading chamber are disposed in the bottom thereof. In addition, for turning the container together with the rotatable section and discharging it by tilting, the rotatable tube section has an additional fixing device that is operated by a separate drive. This additional fixing device is installed on the rotatable section at the side opposite the discharging port of the rotatable section and coacts with the housing of the container.

Figure 2:
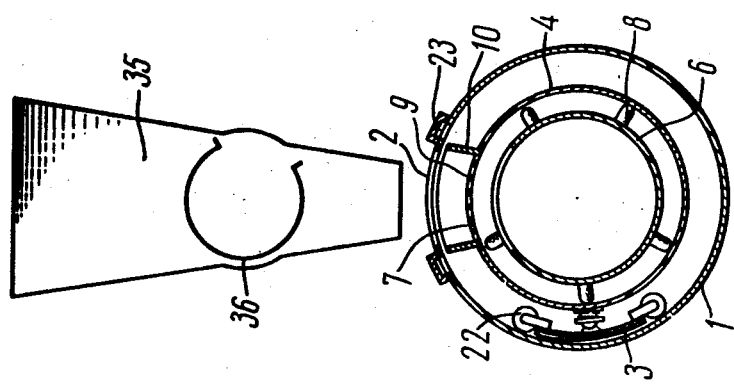
FIG. 2 is a view taken along line II—II of FIG. 1, the view looking in the direction of the arrows, greater scale, with the lid of the chamber charging port open.

The loading and unloading stations can have several charging ports, as shown in FIG. 1 and through which several containers made up into trains are simultaneously loaded (unloaded).

The loading station according to the present invention operates as follows:

Upon the arrival of the container 6 (FIGS. 1 and 2) having no lid at the loading station and after an accurate positioning thereof relative to the charging port 2 of the chamber 1, the electric motor 12 is automatically activated. This motor, through the reduction gear 13, chain transmission 14, gear wheel 15 and toothed sector 16, turns the tube section 4 about its geometrical axis through 90° in a counterclockwise direction. Upon the rotation of the section 4, first, the roller supports 22 move out of the recesses 23; the springs 21 are compressed and a radial movement of the lid 3 takes place; then the lid 3 together with the section 4 turns and opens the charging port 2 of the chamber 1. Simultaneously, charging the port 7 of the section 4 registers with the port 2.

Figure 3:
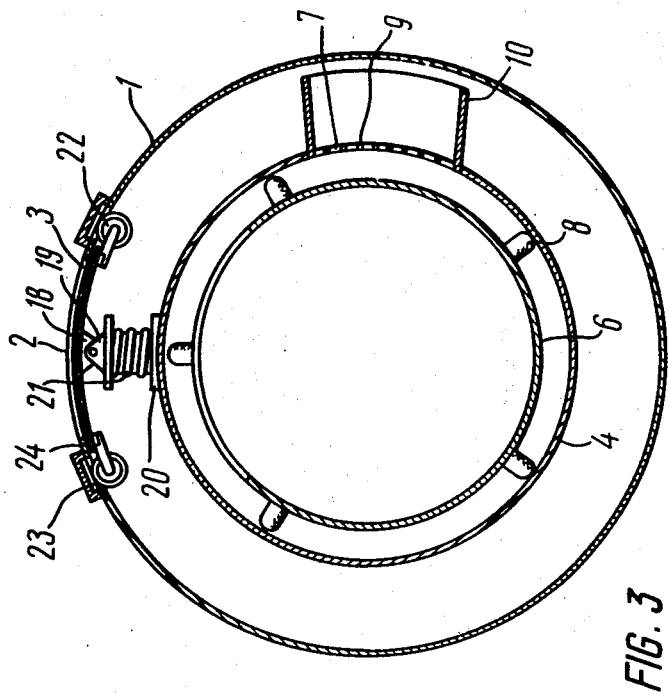
FIG. 3 is the same with the lid closed.

After this, the container 6 is automatically loaded from a hopper 35 by means of a rotatable batching device 36. Upon the completion of the loading, the section 4 with the lid 3 returns to its initial position (FIG. 3).

Should a container 6a having a lid 25 be used, as a result of a radial movement of the lid 3 when the roller supports 22 move out of the recesses 23, the fixing device 27 engages with the lid 25 of the container 6a and opens the lid, turning about the housing of the container 6a together with the rotatable section 4. Loading is performed the same as with the containers 6 without lids. After loading, the lids 3 and 25 turn simultaneously with the turning of the tube section 4 and close the port 2 and container 6a.

The roller supports 22 of the lid 3 enter the recesses 23. The lid 3, moving in a radial direction, by means of the tie rod 34 and the lever 33 beings the fixing device 27 out of engagement with the lid 25 of container 6a. Simultaneously, the lid 3 is pressed by the springs 21 and the pressure of the compressed gas in the tube 5 against the inner surface of the chamber the with its sealing gaskets 24, hermetically closing the chamber 1. After the chamber 1 is hermetically closed, compressed gas is fed into the chamber for the transportation of the train of containers along the tube.

When a container without a lid is being unloaded, the container is tilted by rotating the section of the tube through 180° and the discharging ports of the chamber and the rotatable section are caused to register.

What we claim is:

1. A loading and unloading station of a plant for the pneumatic transportation of goods in containers along a tube, comprising a fixed cylindrical chamber having an inner side, said chamber being provided with at least one charging port; a section of the tube for the pneumatic transportation of goods passing through said chamber mounted for rotation relative to its geometrical axis, said section being provided with at least one charging port for registry with the chamber charging port for loading goods into the containers; said charging ports being out of registry while containers are being conveyed along the tube; a lid for closing said charging port of said chamber; said lid being arranged on the inner side of said chamber, means mounting the lid on said section of the tube for radial movement relative to said section of the tube; and means ensuring rotation of said section of the tube about its geometrical axis.

2. A loading and unloading station of a plant for the pneumatic transportation of goods in containers along a tube, comprising a fixed cylindrical chamber having an inner side, said chamber being provided with at least one charging port; a section of the tube for the pneumatic transportation of goods passing through said chamber mounted for rotation relative to its geometrical axis, said section being provided with at least one charging port; a lid for closing said chamber charging port; said lid being arranged on the inner said of said chamber, means mounting the lid to be capable of radial movement on said section of the tube; means ensuring rotation of said section of the tube about its geometrical axis; roller supports carried by the lid for the chamber charging port, said chamber having recesses on the inner side near the charging port, said supports, when the lid is closed, being disposed in said recesses, and when the lid is opened, said supports moving along the inner side of the chamber.

* * * * *